United States Patent
Al Shammari et al.

(10) Patent No.: US 9,468,957 B1
(45) Date of Patent: Oct. 18, 2016

(54) STORAGE TANK CLEANING MACHINE

(71) Applicant: KING SAUD UNIVERSITY, Riyadh (SA)

(72) Inventors: Sulaiman A. Al Shammari, Riyadh (SA); Mamduh A. El-Messeiry, Riyadh (SA); Ali Mohsen Ali Fares Al-Hazmi, Riyadh (SA); Ibrahim Metaan Gosadi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/012,761

(22) Filed: Feb. 1, 2016

(51) Int. Cl.
| | |
|---|---|
| *B08B 9/08* | (2006.01) |
| *B08B 9/087* | (2006.01) |
| *B08B 9/093* | (2006.01) |
| *B08B 9/46* | (2006.01) |

(52) U.S. Cl.
CPC ............. *B08B 9/087* (2013.01); *B08B 9/0856* (2013.01); *B08B 9/093* (2013.01); *B08B 9/46* (2013.01)

(58) Field of Classification Search
CPC ...... B08B 9/0856; B08B 9/087; B08B 9/093
See application file for complete search history.

(56) References Cited

U.S. PATENT DOCUMENTS

| | | |
|---|---|---|
| 1,876,334 A | 9/1932 | McAnear |
| 2,332,940 A | 10/1943 | Senke |
| 3,196,472 A | 7/1965 | Ventrella |
| 3,341,880 A | 9/1967 | Young |
| 3,457,574 A | 7/1969 | Hirt |
| 3,748,680 A | 7/1973 | Griffin |
| 3,817,348 A * | 6/1974 | Jones ..................... G21C 19/02 15/246.5 |
| 5,720,890 A * | 2/1998 | Caliva .................... B01D 17/00 15/246.5 |
| 5,735,016 A * | 4/1998 | Allen ...................... B08B 9/047 134/113 |
| 6,016,924 A * | 1/2000 | Caliva .................... B01D 17/00 15/246.5 |
| 8,806,697 B1 | 8/2014 | Davila, Jr. |
| 2005/0102777 A1* | 5/2005 | Johansson ................ B60S 3/04 15/53.1 |
| 2011/0126378 A1* | 6/2011 | Ota .......................... B08B 5/02 15/405 |
| 2013/0000672 A1* | 1/2013 | Bovio ....................... B08B 9/08 134/8 |
| 2013/0139332 A1 | 6/2013 | Salahshor |
| 2014/0102484 A1* | 4/2014 | Schober ................. F26B 19/00 134/22.1 |

FOREIGN PATENT DOCUMENTS

| | | |
|---|---|---|
| CN | 201538951 | 8/2010 |
| CN | 201843113 | 5/2011 |

* cited by examiner

*Primary Examiner* — Randall Chin
(74) *Attorney, Agent, or Firm* — Richard C. Litman (57) ABSTRACT

The storage tank cleaning machine is a mobile unit mounted on a trailer for towing by a suitable vehicle. The machine is positioned adjacent the access opening of the tank, e.g., a water tank, cistern, or other storage tank, and a support on the bed of the machine is raised to vertical over the opening. A multiple segment articulating arm extends from the support and is lowered through the opening to access the interior of the tank. A motorized rotary brush extends from the distal end of the arm. Distance sensors adjacent the brush detect the interior surfaces of the tank for accurately positioning the brush. An electronic control system is provided. A tank for water and/or other cleaning fluid and a disinfectant tank are also provided. Fluids used during the cleaning operation are suctioned back to the machine, where the fluids are cleaned and recycled.

19 Claims, 11 Drawing Sheets

STORAGE TANK CLEANING MACHINE

BACKGROUND OF THE INVENTION

1. Field of the Invention

The present invention relates generally to cleaning equipment and machines, and more particularly to a storage tank cleaning machine for cleaning and disinfecting tanks, such as underground water storage tanks, cisterns, and the like.

2. Description of the Related Art

Storage tanks are used for retaining various liquids in a large number of different environments. An example of such is the widespread use of individual water storage tanks or cisterns for household and small business use in various parts of the world, particularly in more arid climates. These tanks are generally installed below ground in order to moderate the influence of high temperatures on the tanks and their contents during the day. Such tanks are usually constructed of poured concrete for their walls, floor, and roof, and are lined with a waterproof coating, such as bitumen and/or ceramic tiles. Such tanks are generally constructed to have an internal volume of anywhere from twelve to thirty-six cubic meters, or from nearly 3,300 U.S. gallons up to nearly 10,000 U.S. gallons of water. The tanks may receive water from a municipal or other water supply network, or from periodic deliveries by tank truck or the like.

Regardless of the purity of the water or other liquid supplied to the tank, there will almost certainly be some eventual buildup of contamination and foreign matter within the tank. In the case of a tank containing potable water, this is potentially quite hazardous due to the potential for bacteria and/or other toxins to develop within the tank. Accordingly, such tanks generally require periodic internal cleaning. Access hatches are generally installed in the tops of such tanks to provide access for internal cleaning.

Such tanks are conventionally cleaned manually. Workers open the access hatch and enter the tank to perform the cleaning operation. The working environment can be hazardous due to poor lighting, high temperatures and humidity, and toxic fumes from disinfectants, such as chlorine products, applied in the tank. Even if the workers are able to clean the tank satisfactorily, there is always some chance that some inadvertent contamination may remain due to the presence of the workers inside the tank. Moreover, any water used to clean and flush the interior of the tank must be pumped out and is generally wasted with no recovery.

Thus, a storage tank cleaning machine solving the aforementioned problems is desired.

SUMMARY OF THE INVENTION

The storage tank cleaning machine is a mobile unit mounted upon a trailer that may be towed by a suitable vehicle. The machine includes a base and a multiple link articulating arm adjustably extending therefrom. The distal end of the arm has a motor-driven rotary brush extending therefrom. The arm extends from a support that is pivoted to the vertical above the access hatch opening for the tank. The arm may be extended downward from the support through the opening and into the tank. The wide range of articulation of the arm and its brush allows the brush to access all of the interior surfaces of the walls, floor, and ceiling of the tank without need for personnel to enter the tank.

The machine includes distance sensors, a camera, and lighting on the distal end of the arm adjacent the rotary brush. The distance sensors determine the distance between the brush and subject wall, allowing the mechanism to position the brush accurately. An onboard electronic operating system provides for proper positioning of the brush and operation of the mechanism. A human operator monitors the system during the cleaning operation.

A water (or other cleaning fluid) supply tank and a disinfectant fluid tank are connected to the machine. The water (or other fluid) and the disinfectant are distributed as required to provide complete cleaning of the interior of the tank. A scavenge pump is lowered to the bottom of the tank, where it draws in any water and/or other fluids from the bottom of the tank and pumps those fluids back to the machine. The machine includes a water cleaning and recycling system, thus assuring that any water remaining in the tank and/or used for cleaning is not wasted or disposed of to contaminate the environment.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
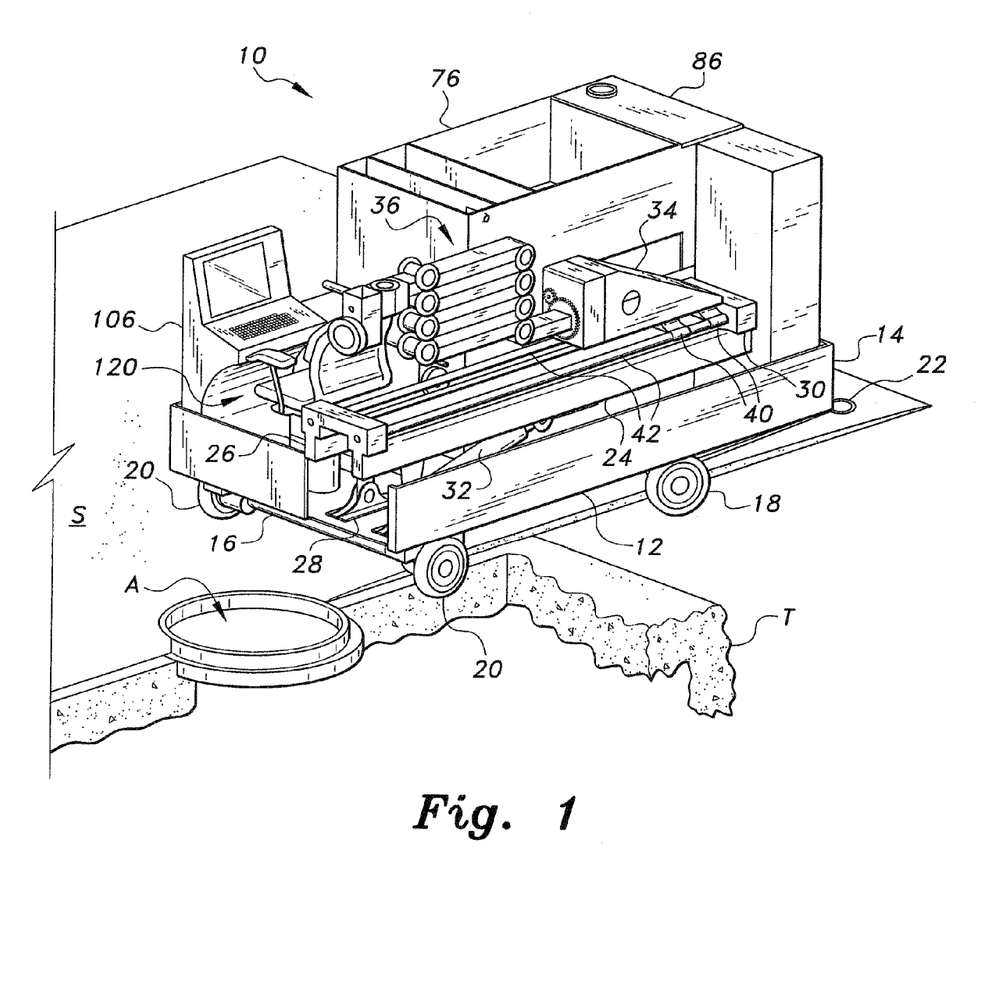
FIG. 1 is an environmental perspective view of a storage tank cleaning machine according to the present invention, a portion of a storage tank being shown in section therebelow.

The storage tank cleaning machine is a mobile or portable device specifically configured for cleaning various types of liquid storage tanks, particularly underground water storage tanks or cisterns. FIG. 1 of the drawings provides an environmental perspective view of the storage tank cleaning machine or machine 10 as it would be positioned over an underground storage tank T (shown broken away beneath the machine 10 and underlying surface S) prior to initiating the cleaning operation. The tank T is provided with an access opening A for cleaning, maintenance, and/or other purposes.

The machine 10 is constructed upon a base platform 12 having a first end 14 and an opposite second end 16. The base platform 12 is preferably a mobile vehicle trailer chassis having a pair of steerable wheels 18 disposed beneath the first end 14 and a pair of non-steerable wheels 20 disposed beneath the second end 16. A trailer tongue and hitch 22, e.g., a pintle ring, a ball socket, etc., extends from the first end 14 of the base platform for towing the machine 10.

In use, the second end 16 of the base platform 12 is positioned immediately adjacent the access opening A of the tank T for cleaning operations, generally as shown in FIG. 1. A selectively extendable arm support column 24 has a first end 26 that is attached to the second end 16 of the base platform 12 by a hinge mechanism 28, and an opposite second end 30. The arm support column 24 is selectively elevated to the vertical during operation and subsequently lowered to rest on the base platform or bed 12 of the machine 10 by a linear actuator 32.

An arm attachment 34 is slidably disposed upon the arm support column 24. The arm attachment 34 travels along the arm support column 24 between the first and second ends 26 and 30 thereof. The selectively articulating arm 36 comprises a plurality of mutually interconnected links or segments, e.g., segments 36a through 36g, shown most clearly in FIGS. 2 and 8, where the arm 36 is shown in its extended configuration. More or fewer arm segments may be provided as needed. The arm 36 includes at least a first end segment 36a and a second end segment, shown as final segment 36g in this embodiment. Each of the segments 36a through 36g includes mutually opposed first and second ends 38a and 38b. The first end 38a of the first arm segment 36a is attached to arm attachment 34 (or more specifically, to its arm attachment extension 34a), and the second end 38b of the final arm segment 36g is attached to a brush drive head, described in detail further below. Details of the arm segment first and second ends 38a and 38b are shown most clearly in FIG. 4, and described in detail further below.

Figure 2:
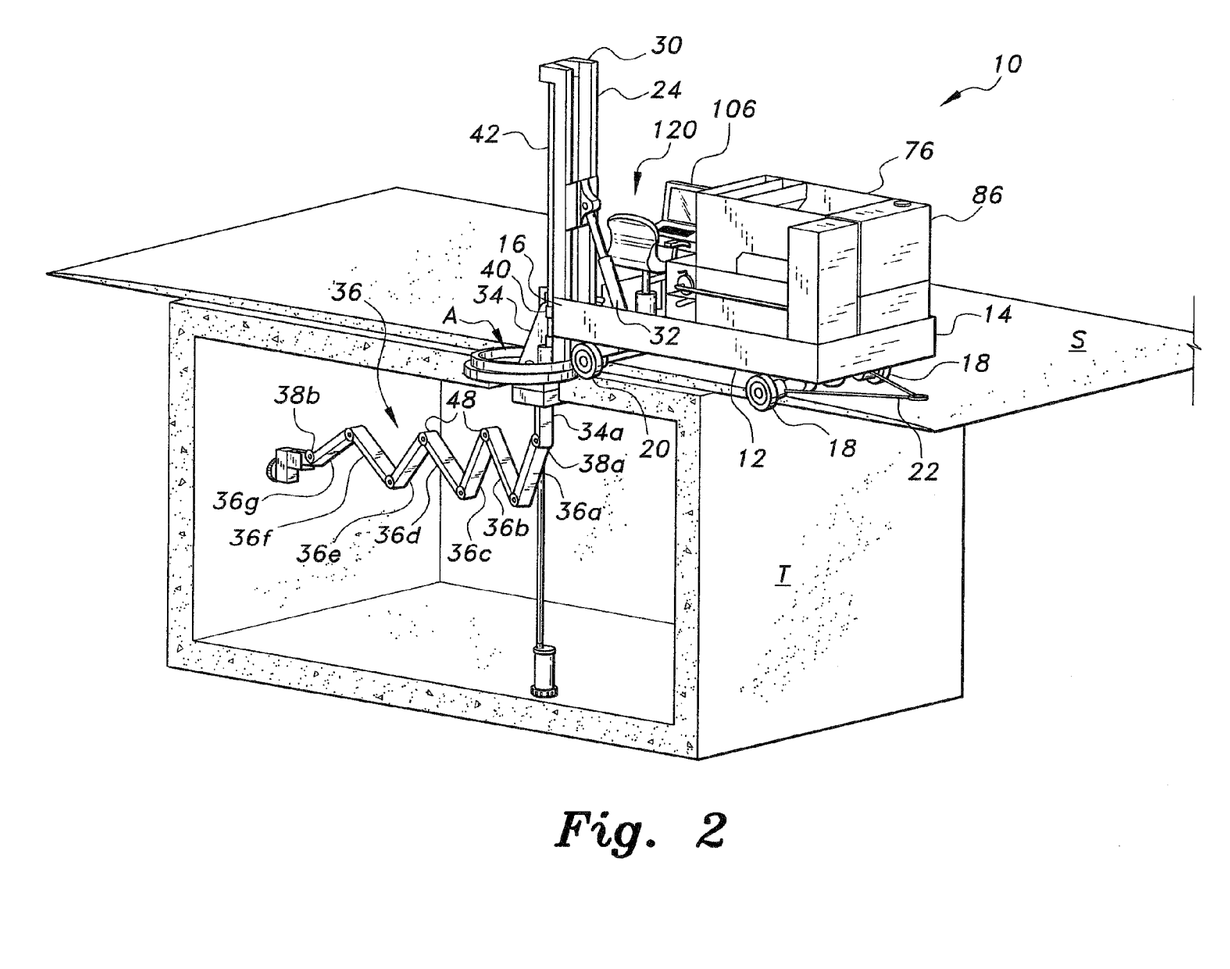
FIG. 2 is another environmental perspective view of the storage tank cleaning machine of FIG. 1, showing its operation.
Figure 3:
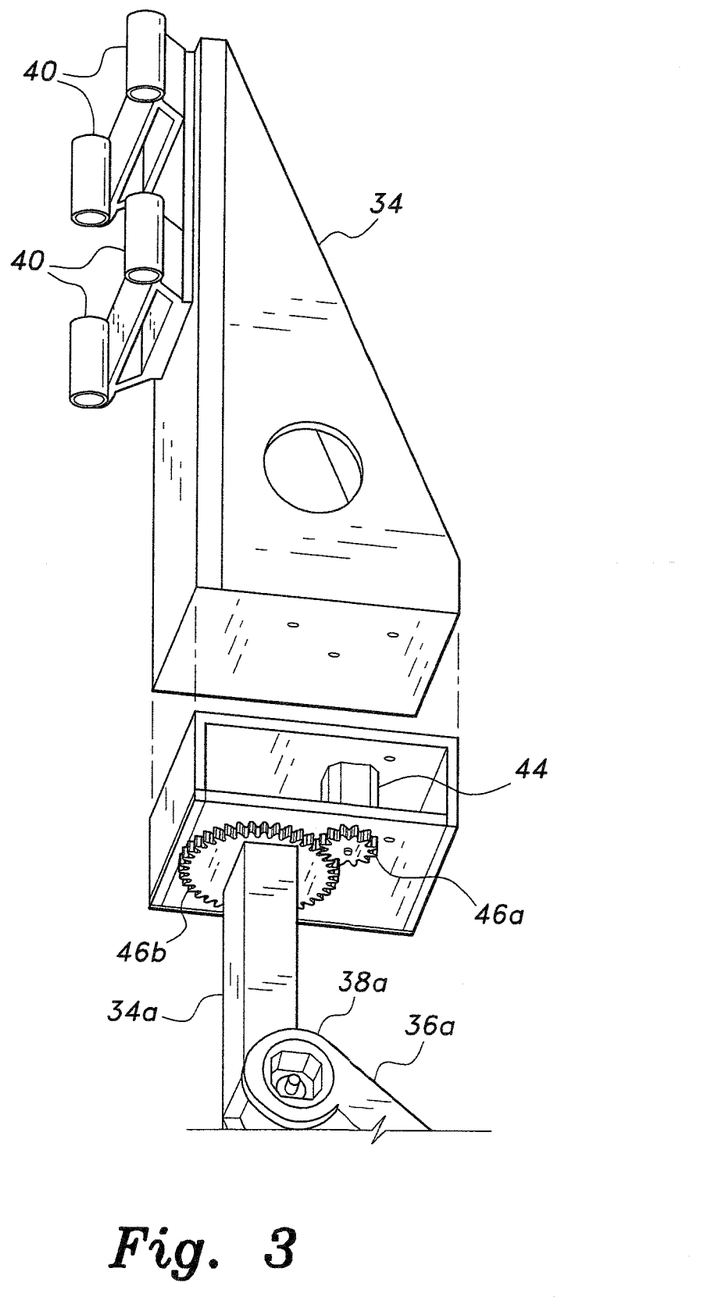
FIG. 3 is a detailed exploded perspective view of the upper carrier of the articulating arm assembly of the storage tank cleaning machine of FIG. 1, showing various details thereof.

FIGS. 3 through 5 provide detailed illustrations of the articulating arm 36 mechanism. FIG. 3 provides a detailed perspective view of the arm attachment 34. The arm attachment 34 includes a series of cylindrical slides 40 that slide on a pair of parallel rods 42 (FIG. 1), allowing the arm attachment 34 to travel along the length of the arm support column 24, as shown in FIG. 2. The driving mechanism may be any conventional electrical or other system. The arm attachment extension 34a can rotate relative to the arm attachment 34 by means of a drive motor 44 disposed in the base of the arm attachment 34. The drive motor 44 drives a gear 46a, which drives a driven gear 46b from which the arm attachment extension 34a extends. The first end 38a of the first arm segment 36a is pivotally attached to the distal end of the arm attachment extension 34a. In this manner, the entire articulating arm assembly 36 can rotate axially relative to the longitudinal axis of the arm attachment 34, the arm attachment extension 34a, and the arm support column 24.

Figure 4:
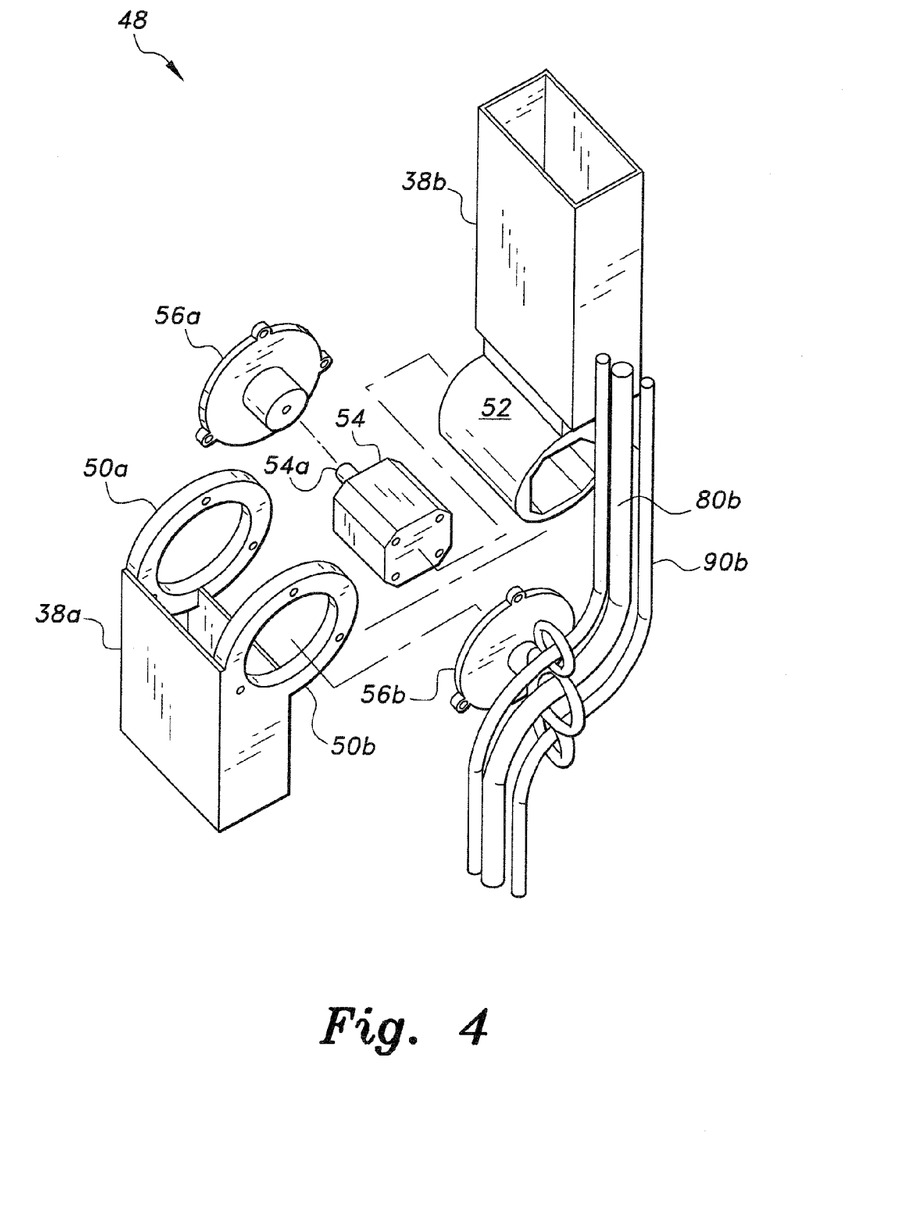
FIG. 4 is a detailed exploded perspective view of a joint assembly of the articulating arm of the storage tank cleaning machine of FIG. 1, showing various details thereof.

FIG. 4 provides a detailed exploded perspective view of an exemplary adjustable connecting joint 48, as found between each of the arm segments 36a through 36g. The first end 38a of each arm segment includes a pair of parallel rings 50a and 50b immovably affixed to the segment 36a-36g and extending therefrom. The second end 38b of each arm segment 36a-36g has a motor housing 52 immovably affixed thereto and extending therefrom. An arm adjustment motor 54 is affixed within the motor housing 52, e.g., by means of their congruent non-circular shapes. The output shaft 54a is rotationally affixed to a plate 56a that is rotationally affixed to the first ring 50a of the first arm attachment end 38a. A second plate 56b serves as a cover plate and also as a guide for electrical and fluid lines extending from components on the base platform 12 to the components installed at the distal second end 38b of the arm segment 36a-36g. Thus, when the arm adjustment motor 54 is actuated, its output shaft 54a causes the first plate 56a to rotate relative to the motor 54, the motor housing 52, and the second end 38b of the arm segment 36a-36g. As the first plate 56a is rotationally affixed to the first end 38a of the next arm segment 36a-36g via the first ring 50a, it will be seen that the two connected arm segments will articulate angularly relative to one another. All of the connecting joints 48 of the arm segments 26a-36g operate in the same manner.

Figure 5:
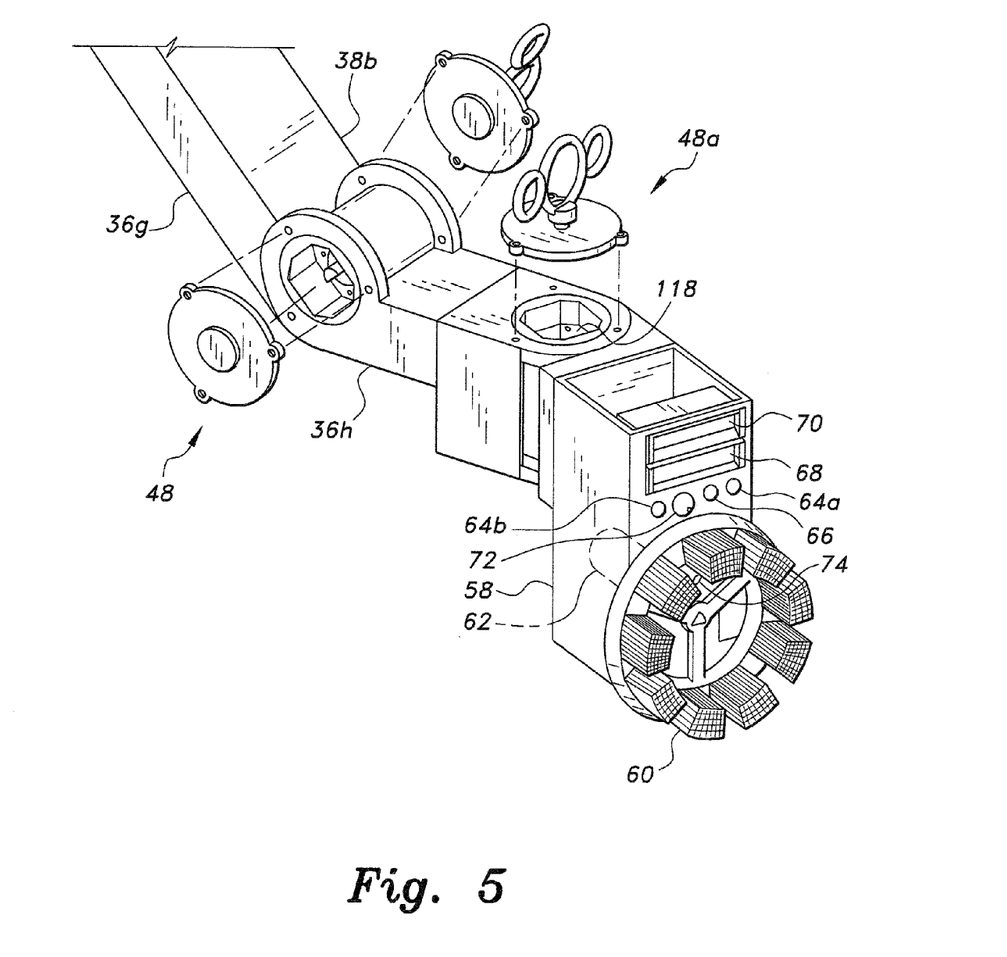
FIG. 5 is a detailed perspective view of the brush head assembly of the storage tank cleaning machine of FIG. 1, showing various details thereof.

FIG. 5 is a perspective view of the brush drive assembly extending from the second end 38b of the final arm segment 36g. A relatively short articulating arm extension 36h extends from the joint 48 at the second end 38b of the final arm segment 36g. A brush drive head joint 48a is installed at the distal end of the arm extension 36h. The brush drive head joint 48a is substantially identical in structure and operation to the other articulating arm joints 48 shown in detail in FIG. 4 and discussed further above, but its axis of rotation is orthogonal to the axes of rotation of the other joints 48. In this manner, the brush drive head 58 may be arcuately articulated in two mutually orthogonal planes. Rotation of the entire articulating arm assembly 36 from the arm attachment 34 (shown in FIG. 3) provides arcuate movement in a third axis perpendicular to the other two axes.

A rotary brush 60 extends from the brush drive head 58. The head 58 has a selectively operable brush drive motor 62 disposed therein. The brush drive head 58 includes additional devices, as well. First and second ultrasonic sensors 64a and 64b are aimed from the front of the brush drive head 58 in the direction or orientation of the rotary brush 60. These sensors 64a and 64b measure or determine the distance between the brush drive head 58 (and therefore the brush 60) and the facing wall of the tank T. This system allows the brush 60 to be maneuvered precisely to the tank wall for accurate positioning and cleaning of the wall. A camera lens 66 enables a remotely situated camera in the head 58 to receive visible light images, and those images are transmitted via the electrical line or cable (FIG. 4) to an operator's station or console aboard the base platform 12 of the machine 10. Lighting is provided by a light 68 (e.g., an LED, etc.) in the front of the brush drive head 58, providing lighting in the visible spectrum. An additional ultraviolet light or lamp 70 may be provided to emit ultraviolet light from the front of the head 58 to provide additional disinfectant and sterilizing effects. A wash nozzle 72 is also provided in the head 58 to dispense wash or rinse water (or other fluid) after the rotary brush 58 has scrubbed and cleaned the tank wall. Finally, a brush wetting nozzle 74 dispenses a cleaning and/or disinfecting fluid or agent (e.g., sodium hypochlorite or other agent) onto the brush 60 during the scrubbing operation.

Figure 6:
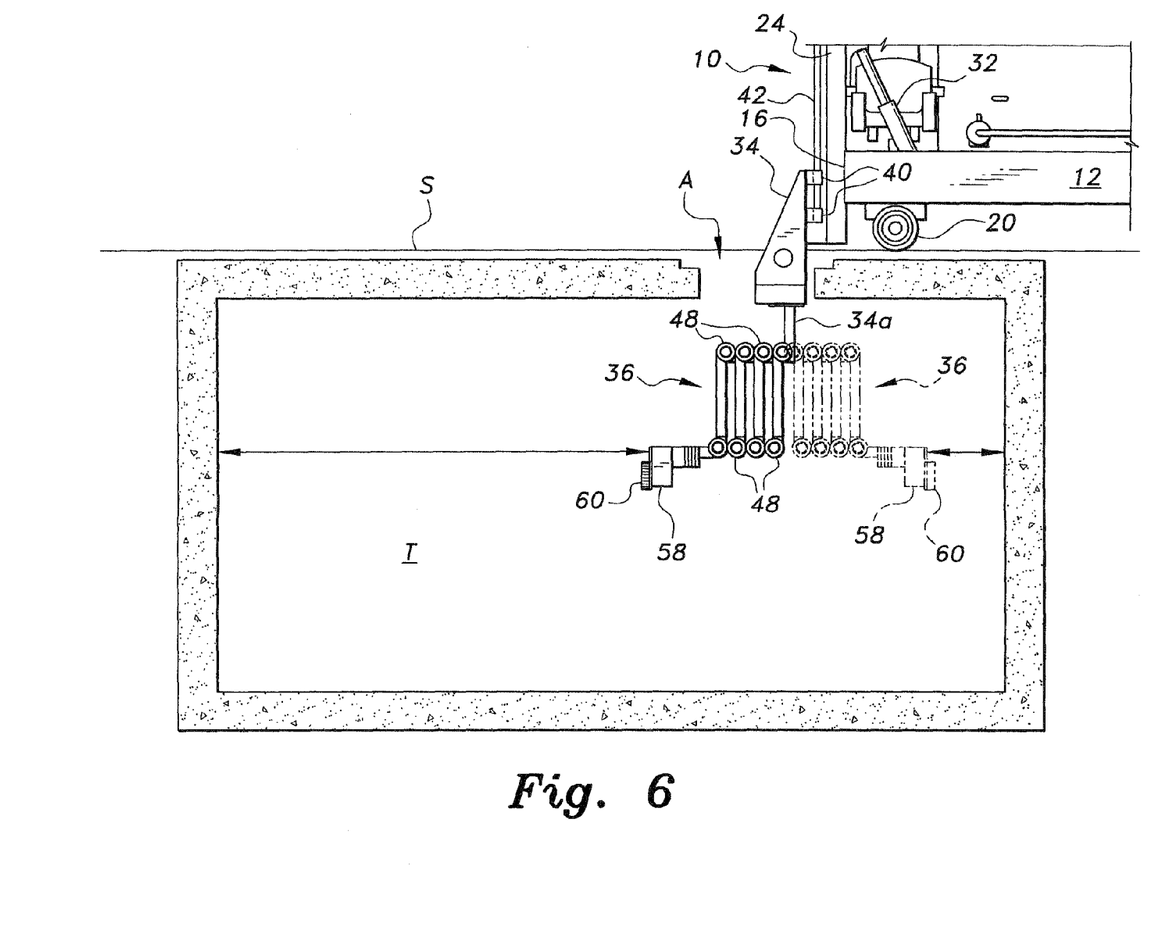
FIG. 6 is an environmental elevation view of a portion of the storage tank cleaning machine of FIG. 1, showing one aspect of the operation of the articulating arm assembly.
Figure 7:
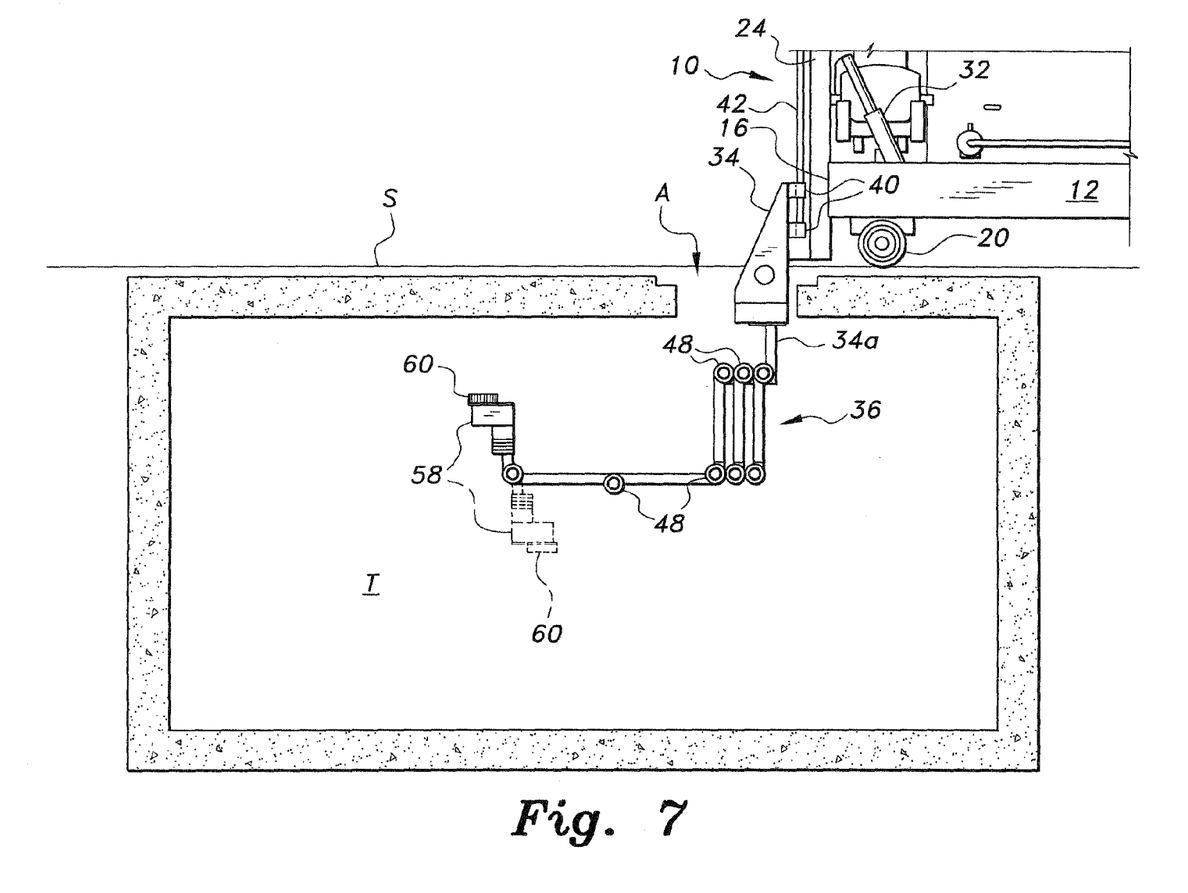
FIG. 7 is an environmental elevation view of a portion of the storage tank cleaning machine of FIG. 1, showing another aspect of the operation of the articulating arm assembly.
Figure 8:
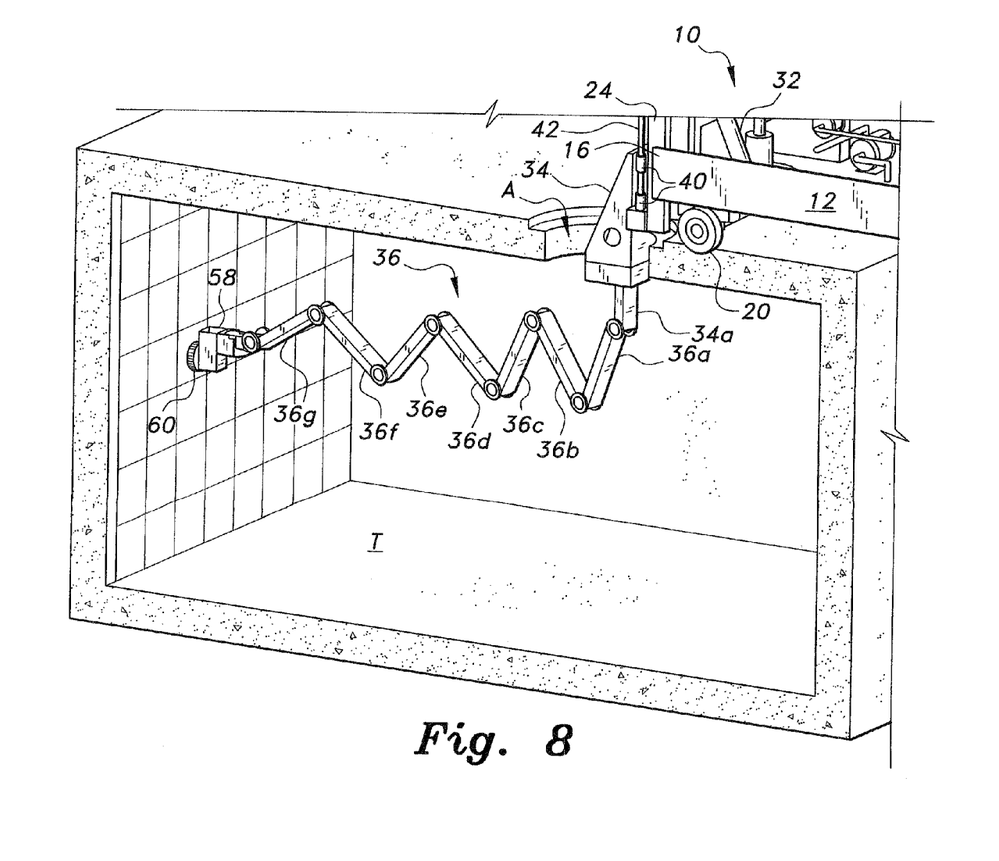
FIG. 8 is an environmental perspective view of a portion of the storage tank cleaning machine of FIG. 1, showing operation of the articulating arm assembly and the rotating brush.

FIGS. 6 through 8 illustrate positioning of the arm 36 and the attached brush head 58 and rotary brush 60 into the tank T for tank cleaning operations. In FIG. 6, the arm support column 24 has been raised to vertical above the access opening A of the tank T, and the arm attachment 34 has been lowered to the lower or first end 26 of the arm support column 24. The articulating arm assembly 36 is thus positioned within the tank T, and the arm attachment extension 34a is rotated to orient the arm 36 toward whichever wall of the tank T that may be desired. In FIG. 6, the arm 36, brush head 58, and brush 60 are shown in solid lines oriented toward the left-hand wall, and alternative positioning toward the right-hand wall is shown in broken lines. This process of orienting the brush head 58 to face each of the interior walls of the tank T allows the ultrasonic sensors 64a, 64b to determine the distances to each of the walls, and thus the interior dimensions of the tank T, through appropriate software.

FIG. 7 illustrates initial extension of two segments of the arm 36 and articulation of the brush head 58 and brush 60. The brush head 58 and brush 60 are shown in solid lines oriented toward the inside of the top panel of the tank T, as they would be oriented for determining the distance to the inside of the top panel of the tank. Positioning of the brush head 58 and brush 60 for determining the distance to the inside floor of the tank T is shown in broken lines. It will be seen that articulation of the various arm segments, e.g., segments 36a through 36g, can position the brush head 58 and its rotary brush 60 anywhere within the internal volume of the tank T to scrub and clean essentially all of the interior surfaces of the tank T.

FIG. 8 of the drawings illustrates an exemplary scenario during the tank cleaning operation. A software algorithm may arbitrarily divide each interior wall or panel surface of the tank T into a grid, as shown on the left wall of the tank in FIG. 8. The software then determines the required angles of articulation for the arm 36, its segments 36a, 36b, 36c, 36d, 36e, 36f, and 36g, and the brush head 58 in order to orient the face of the rotary brush 60 coplanar with the tank wall surface at any given grid position of the brush 60. This process is repeated for each section of the arbitrary grid developed by the software to describe the interior surface of each wall and panel of the tank T.

Figure 9:
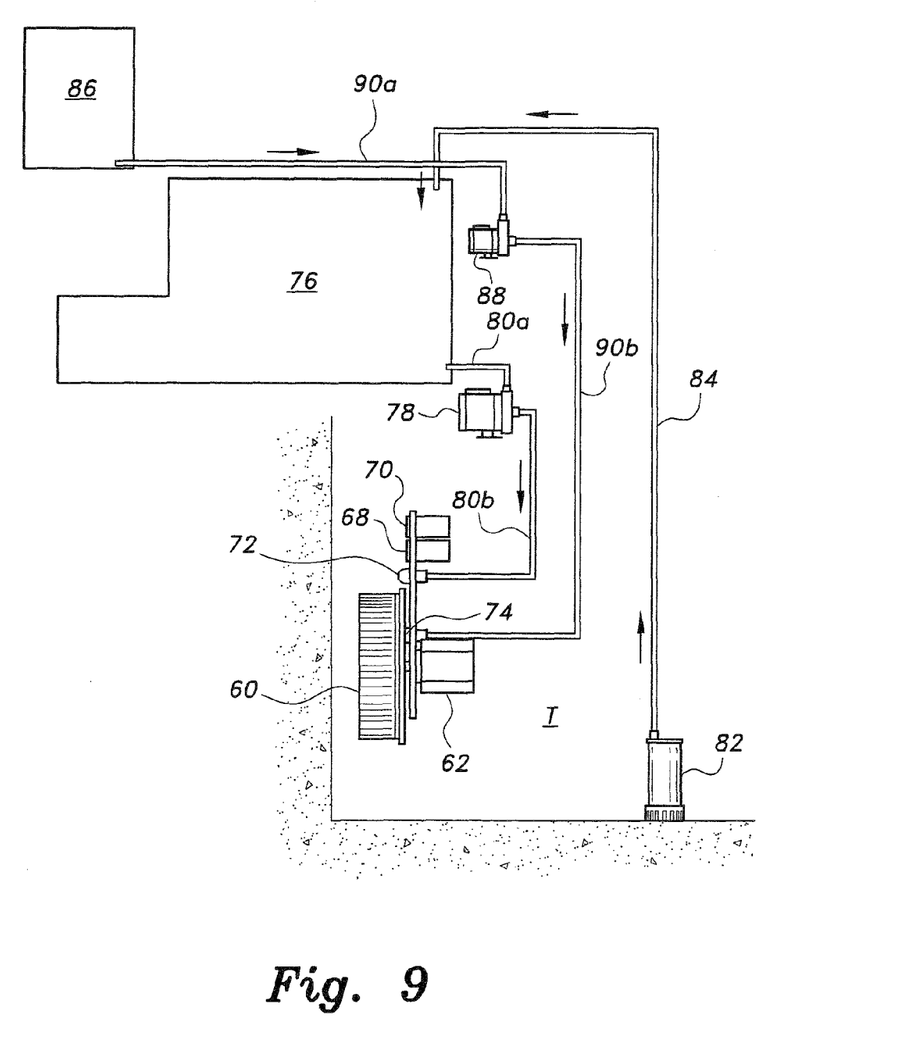
FIG. 9 is a schematic diagram of hydraulic features of the storage tank cleaning machine of FIG. 1, including the recycling tank, disinfectant tank, rotating brush, and scavenge pump, showing their relationships and interconnecting fluid lines.

FIG. 9 of the drawings is a schematic diagram illustrating the fluid cleaning and recycling system of the machine 10, including the various fluid tanks, pumps, and connecting lines of the system. The larger tank 76 shown in FIG. 9 is actually a complete water or fluid treatment unit for cleaning and recycling water (or other fluid) used for cleaning the interior of the tank T, as well as a water or other fluid storage unit. Clean water is drawn from the water treatment unit or tank 76 by a wash pump 78 via dispensing line 80a. The wash pump 78 pumps the water via dispensing line 80b (also shown in FIG. 4) to the wash liquid dispensing nozzle 72 (also shown in FIG. 5) situated just above the rotary brush 60. Water or other liquid that collects on the floor of the tank T is drawn by a sump or scavenge pump 82 that has been lowered to the tank floor during the initial setup of the system. The scavenged water or other liquid is then returned to the fluid treatment tank 76 for cleaning and processing via a return line 84.

The smaller tank shown in FIG. 9 is a disinfectant tank 86 for containing sodium hypochlorite and/or other disinfectant agent. A disinfectant delivery pump 88 draws disinfectant from the tank 86 and distributes it to the brush nozzle 74 via disinfectant lines 90a and 90b. The liquid dispensed from the brush nozzle 74 eventually flows to the floor of the tank T and is scavenged by the pump 82, which serves as a delivery pump for return delivery of water to the treatment tank 76 with other liquids.

Figure 10:
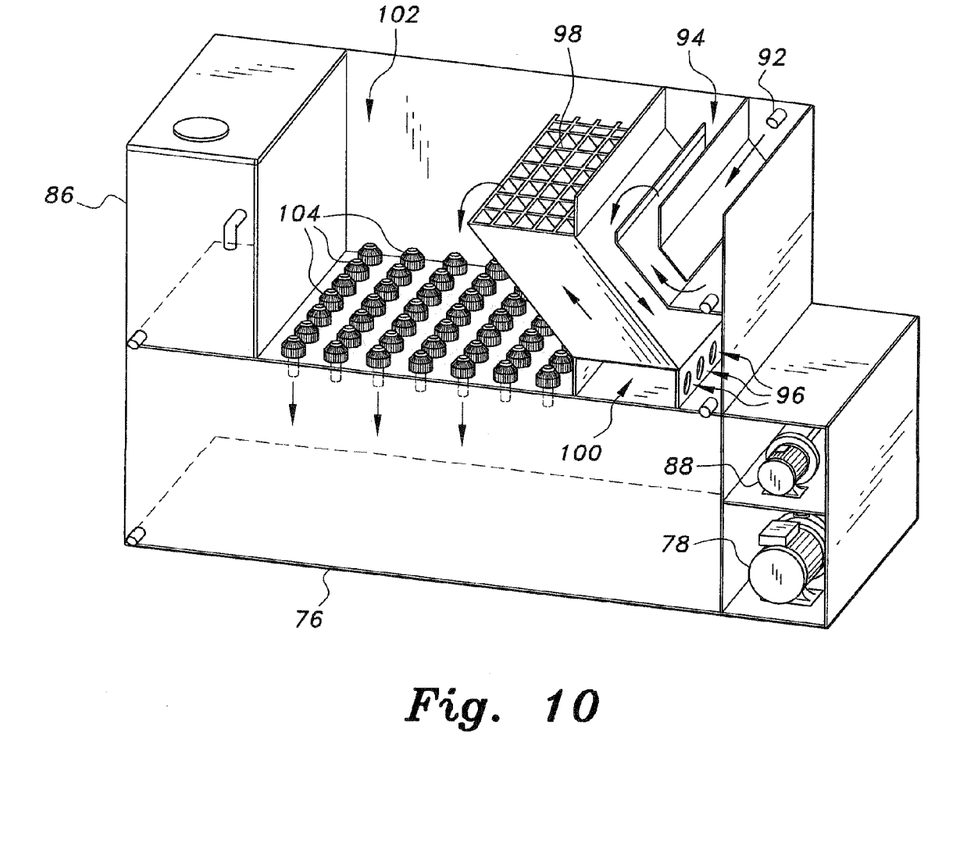
FIG. 10 is a perspective view in partial section of the recycling tank of the storage tank cleaning machine of FIG. 1, illustrating its internal components.

FIG. 10 provides a perspective view in section of the treatment tank 76 and its collocated disinfectant tank 86. These components are also shown in FIGS. 1 and 2 of the drawings. Scavenged water and/or other liquid enters the tank 76 from the return line 84 (FIG. 9) via an inlet 92, where it flows in a sinusoidal path through a skimming unit or component 94. Floating matter, e.g., oils, buoyant materials, etc. are captured here, while the water or other liquid exits the skimming unit 94 through ports 96 to flow upward through settling tubes 98 that serve to precipitate non-buoyant solid matter out of solution, which settles into the settling chamber 100 located beneath the settling tubes 98.

The partially treated water or other liquid departs the top of the settling tubes 98 to flow into a filter bed 102 disposed atop the fluid storage tank 76 proper. The filter bed includes an upper layer of coarse sand or gravel (not shown), through which the partially treated water percolates. The bottom of the filter bed 102 includes a plurality of separate, individual filters 104 that also serve as drains to allow the treated water or other liquid to flow back into the storage tank 76 therebelow. The treated water or other liquid is then pumped back to the wash water or fluid nozzle 72 in the brush head 58 via the first dispensing line 80a, the wash pump 78, and the second dispensing line 80b for reuse, as shown schematically in FIG. 9.

Figure 11:
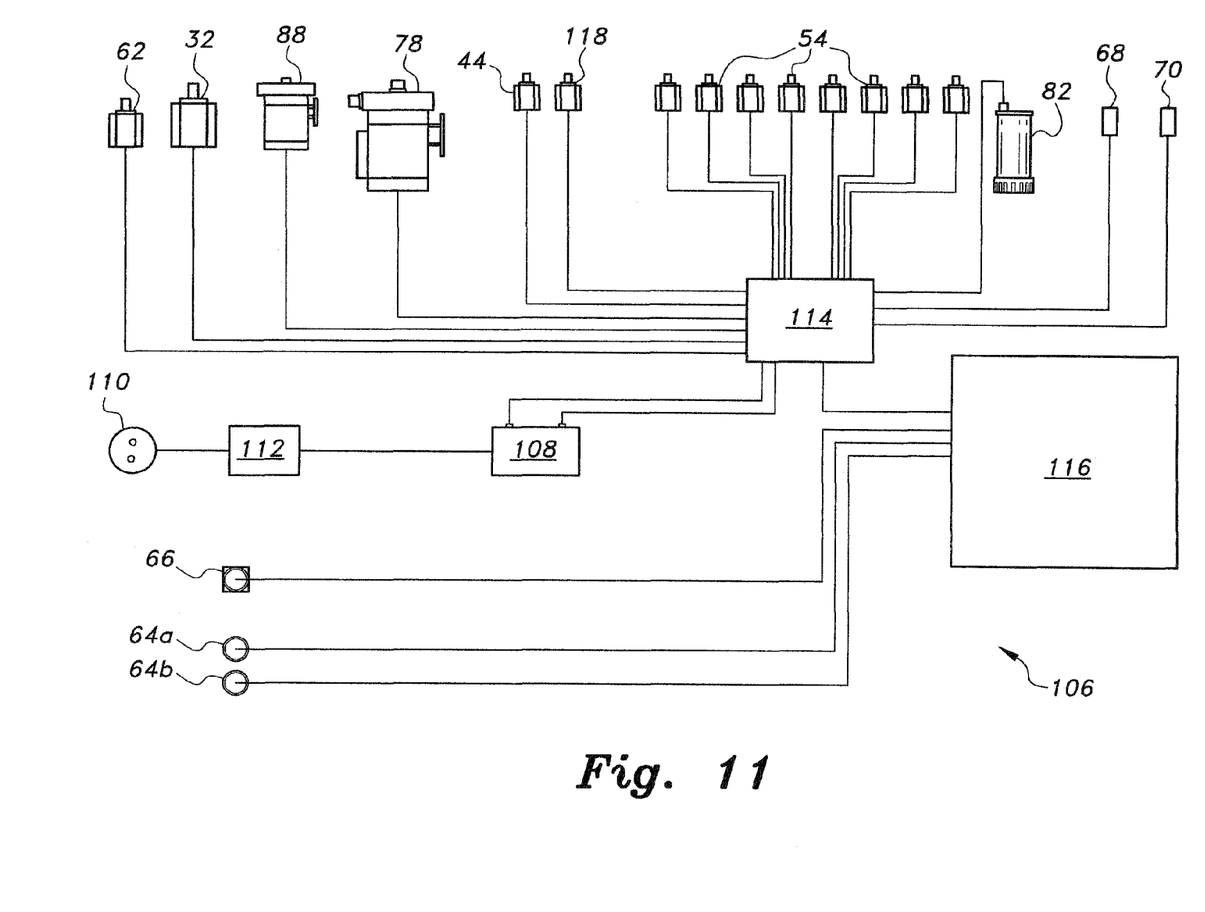
FIG. 11 is a schematic diagram of the operating system of the storage tank cleaning machine of FIG. 1, illustrating the basic components and their relationships to one another.

A control system 106 is provided to control and monitor the various components of the machine 10. The control system 106 with its monitor and keyboard are shown generally in FIGS. 1 and 2 of the drawings with the base platform 12 and other structure. FIG. 11 provides a schematic diagram of the basic components of the system. The entire system is preferably electrically powered, having an on-board electrical storage battery or batteries 108 providing the required electrical power. The machine 10 may include an on-board engine and generator system (not shown), or alternatively, may have an external power receptacle 110 and charger 112 to recharge the battery or batteries 108 between operations.

The electrical battery or batteries 108 provide(s) electrical power to a controller 114, which provides electrical power to the various electric motors of the machine 10. It will be seen in FIG. 11 that the controller 114 selectively provides electrical power to the plurality of stepper motors 54 located at the joints of the various arm segments 36a through 36g for control of the arm 36, and controls other components including: the rotary drive stepper motor 44 that rotates the arm attachment extension 34a (FIG. 3); the stepper motor 118 that drives the brush drive head joint 48a of FIG. 5; the wash pump 78 (FIGS. 9 and 10); the disinfectant pump 88 (FIGS. 9 and 10); the linear actuator motor 32 for raising and lowering the arm support column 24 (FIGS. 1 and 2); the rotary brush drive motor 62 (FIGS. 5 and 9); the scavenge pump 82 (FIG. 9); and the visual spectrum light 68 and ultraviolet light 70 (FIG. 9).

The controller 114 may be provided from any of a number of sources, an Arduino® control board being exemplary. The controller 114 also provides electrical power to the central computer 116. The computer 116 provides operating commands to the controller 114. The computer 116 also receives signals from the two ultrasonic range or distance sensors 64a and 64b (FIG. 5) and the camera lens 66 (FIG. 5). The system is monitored and manually controlled by a human operator seated at an operating station 120 (FIGS. 1 and 2).

It is to be understood that the present invention is not limited to the embodiments described above, but encompasses any and all embodiments within the scope of the following claims.

We claim:

1. A storage tank cleaning machine, comprising:
   a base platform having a first end and a second end opposite the first end;
   a selectively extendible arm support column disposed upon the base platform, the arm support column having a first end pivotally attached to the first end of the base platform and a second end opposite the first end;
   an arm attachment slidably disposed upon the arm support column;
   a selectively articulating arm extending from the arm attachment, the articulating arm having:
   a plurality of interconnected arm segments including at least a first end segment and a second end segment, each of the arm segments having mutually opposed first and second ends, the first end of the first arm segment being pivotally attached to the arm attachment;
   an adjustable connecting joint disposed at each of the ends of each of the arm segments; and
   an arm adjustment motor disposed in each of the connecting joints;
   a brush drive head pivotally disposed at the second end of the second end segment of the articulating arm;
   a brush drive motor disposed within the brush drive head; and
   a rotating brush extending from the brush drive motor.

2. The storage tank cleaning machine according to claim 1, further comprising:
   at least one ultrasonic range sensor disposed on the brush drive head;
   a camera disposed on the brush drive head; and
   a visual spectrum light disposed on the brush drive head.

3. The storage tank cleaning machine according to claim 1, further comprising:
   a fluid cleaning and recycling system disposed upon the base platform, the fluid cleaning and recycling system including:
   a fluid storage tank; and
   a disinfectant tank;
   a wash fluid nozzle disposed on the brush drive head, the wash fluid nozzle communicating with the fluid storage tank; and
   a disinfectant dispenser disposed on the rotating brush, the disinfectant dispenser communicating with the disinfectant tank.

4. The storage tank cleaning machine according to claim 3, further comprising:
   a buoyant matter skimming apparatus disposed atop the fluid storage tank;
   a solids precipitate apparatus disposed atop the fluid storage tank, the solids precipitate apparatus communicating fluidly with the buoyant matter skimming apparatus;
   a filter bed disposed atop the fluid storage tank, the filter bed communicating with the solids precipitate apparatus and with the fluid storage tank;
   a fluid delivery pump communicating with the fluid storage tank; and
   a disinfectant delivery pump communicating with the disinfectant tank.

5. The storage tank cleaning machine according to claim 1, further comprising an ultraviolet light disposed on the brush drive head.

6. The storage tank cleaning machine according to claim 1, further comprising a control system disposed upon the base platform, the control system communicating with and controlling at least each of the arm adjustment motors and the brush drive motor.

7. The storage tank cleaning machine according to claim 1, wherein the base platform comprises a mobile vehicle trailer chassis.

8. A storage tank cleaning machine, comprising:
   a base platform;
   a selectively articulating arm extending from the base platform, the arm having at least a second end;
   a brush drive head pivotally disposed at the second end of the articulating arm;
   a brush drive motor disposed within the brush drive head;
   a rotating brush extending from the brush drive motor;
   at least one ultrasonic range sensor disposed on the brush drive head;
   a camera disposed on the brush drive head; and
   a visual spectrum light disposed on the brush drive head.

9. The storage tank cleaning machine according to claim 8, wherein said base platform has a first end and a second end opposite the first end, the machine further comprising:
   a selectively extendible arm support column disposed upon said base platform, the arm support column having a first end pivotally attached to the first end of said base platform and a second end opposite the first end;
   an arm attachment slidably disposed upon the arm support column, said articulating arm extending from the arm attachment, said articulating arm having:
   a plurality of interconnected arm segments including at least a first end segment and a second end segment, each of the arm segments having mutually opposed first and second ends, the first end of the first arm segment being pivotally attached to the arm attachment;
   an adjustable connecting joint disposed at each of the ends of each of the arm segments; and
   an arm adjustment motor disposed in each of the connecting joints.

10. The storage tank cleaning machine according to claim 9, further comprising a control system disposed upon the base platform, the control system communicating with and controlling at least each of the arm adjustment motors and the brush drive motor.

11. The storage tank cleaning machine according to claim 8, further comprising:
    a fluid cleaning and recycling system disposed upon the base platform, the fluid cleaning and recycling system including:
    a fluid storage tank; and
    a disinfectant tank;
    a wash fluid nozzle disposed on the brush drive head, the wash fluid nozzle communicating with the fluid storage tank; and
    a disinfectant dispenser disposed on the rotating brush, the disinfectant dispenser communicating with the disinfectant tank.

12. The storage tank cleaning machine according to claim 11, further comprising:
    a buoyant matter skimming apparatus disposed atop the fluid storage tank;
    a solids precipitate apparatus disposed atop the fluid storage tank, the solids precipitate apparatus communicating fluidly with the buoyant matter skimming apparatus;

a filter bed disposed atop the fluid storage tank, the filter bed communicating with the solids precipitate apparatus and with the fluid storage tank;

a fluid delivery pump communicating with the fluid storage tank; and a disinfectant delivery pump communicating with the disinfectant tank.

13. The storage tank cleaning machine according to claim 8, further comprising an ultraviolet light disposed on the brush drive head.

14. The storage tank cleaning machine according to claim 8, wherein the base platform comprises a mobile vehicle trailer chassis.

15. A storage tank cleaning machine, comprising:
a base platform;
a fluid cleaning and recycling system disposed upon the base platform, the fluid cleaning and recycling system including:
a fluid storage tank; and
a disinfectant tank;
an articulating arm extending from the base platform, the arm having at least a second end;
a brush drive head pivotally disposed at the second end of the articulating arm;
a brush drive motor disposed within the brush drive head;
a rotating brush extending from the brush drive motor;
a wash fluid nozzle disposed on the brush drive head, the wash fluid nozzle communicating with the fluid storage tank;
a disinfectant dispenser disposed on the rotating brush, the disinfectant dispenser communicating with the disinfectant tank;
a buoyant matter skimming apparatus disposed atop the fluid storage tank;
a solids precipitate apparatus disposed atop the fluid storage tank, the solids precipitate apparatus communicating fluidly with the buoyant matter skimming apparatus;
a filter bed disposed atop the fluid storage tank, the filter bed communicating with the solids precipitate apparatus and with the fluid storage tank;

a fluid delivery pump communicating with the fluid storage tank; and a disinfectant delivery pump communicating with the disinfectant tank.

16. The storage tank cleaning machine according to claim 15, wherein the base platform has a first end and a second end opposite the first end, the machine further comprising:
a selectively extendible arm support column disposed upon the base platform, the arm support column having a first end pivotally attached to the first end of the base platform and a second end opposite the first end;
an arm attachment slidably disposed upon the arm support column, the articulating arm extending from the arm attachment, the articulating arm having:
a plurality of interconnected arm segments including at least a first end segment and a second end segment, each of the arm segments having mutually opposed first and second ends, the first end of the first arm segment being pivotally attached to the arm attachment;
an adjustable connecting joint disposed at each of the ends of each of the arm segments; and
an arm adjustment motor disposed in each of the connecting joints.

17. The storage tank cleaning machine according to claim 16, further comprising a control system disposed upon the base platform, the control system communicating with and controlling at least each of the arm adjustment motors and the brush drive motor.

18. The storage tank cleaning machine according to claim 15, further comprising:
at least one ultrasonic range sensor disposed on the brush drive head;
a camera disposed on the brush drive head;
a visual spectrum light disposed on the brush drive head; and
an ultraviolet light disposed on the brush drive head.

19. The storage tank cleaning machine according to claim 15, wherein the base platform comprises a mobile vehicle trailer chassis.

* * * * *